March 15, 1960 T. D. ADAMS 2,928,183
INCLINOMETER
Filed June 27, 1956 2 Sheets-Sheet 1
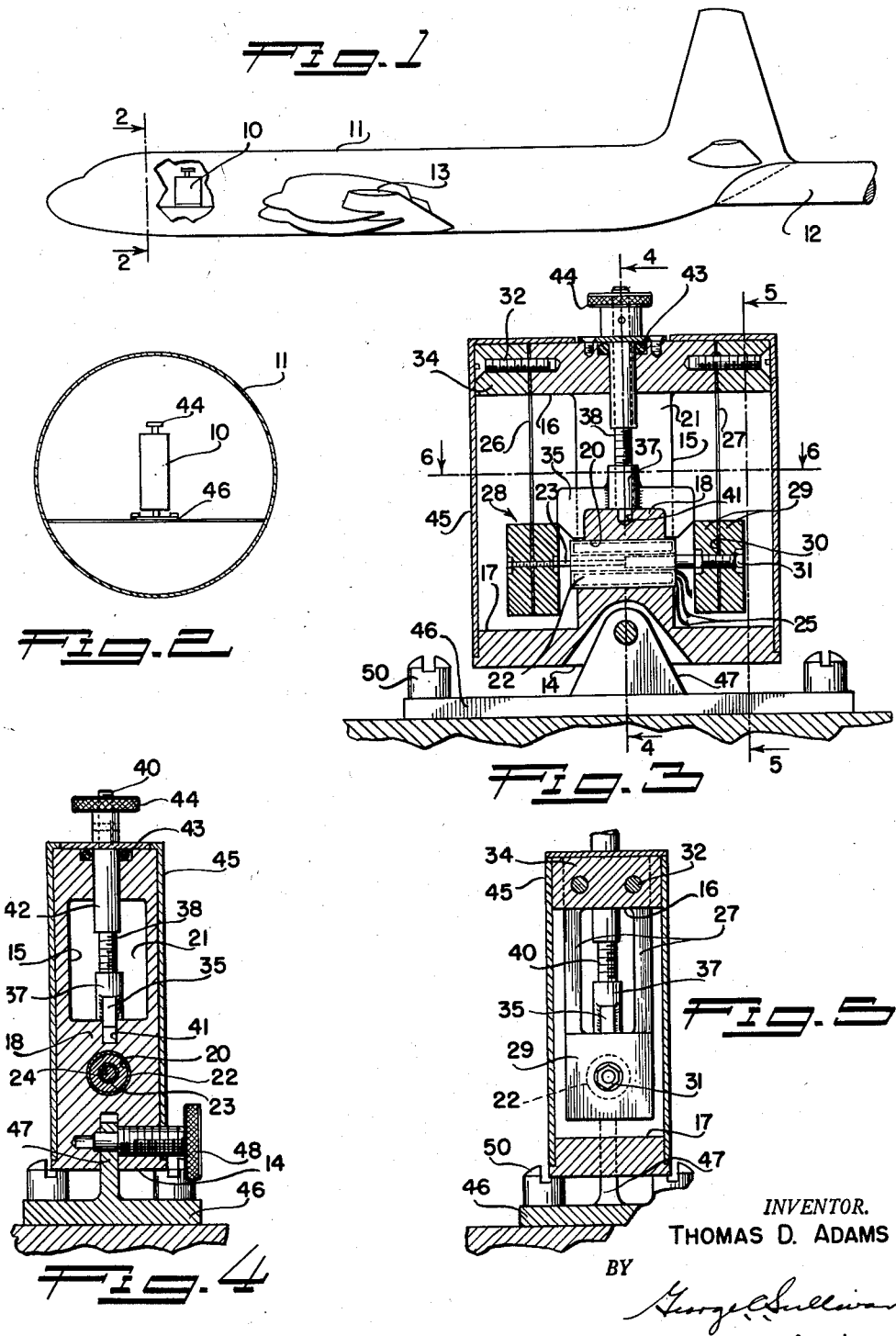
INVENTOR.
THOMAS D. ADAMS
BY
Agent March 15, 1960

T. D. ADAMS 2,928,183

INCLINOMETER

Filed June 27, 1956

INVENTOR.
THOMAS D. ADAMS
BY
George C. Sullivan
Agent

United States Patent Office 2,928,183
Patented Mar. 15, 1960

2,928,183
INCLINOMETER

Thomas D. Adams, Van Nuys, Calif., assignor to Lockheed Aircraft Corporation, Burbank, Calif.

Application June 27, 1956, Serial No. 594,291

3 Claims. (Cl. 33—206)

This invention relates to electro-mechanical transducing apparatus and, more particularly, to apparatus for measuring angles of inclination from a predetermined plane of a structural surface.

In many industries it has been found desirable to measure the angle of inclination of a structural member undergoing tests or to determine its stiffness parameters so that data may be obtained for use in future design of the structural members. For example, in the aircraft industry it is desirable to determine and record angles of deflection of structural members such as the angle of attack of a sting mounted windtunnel aircraft model undergoing a test. The angle of attack is the acute angle between the chord of an aircraft wing or other airfoil and its direction of motion. Conventional equipments, such as linear measurement devices, have been employed but have been undesirable due to additional computations necessary to determine the amount of deviation from a predetermined plane in accordance with the linear deflection. Another problem present in the aircraft industry is providing suitable measuring apparatus for checking the angular deflection of aircraft control surfaces without expensive test sets. One method consists of placing a large mirror in a position to reflect sunlight onto a small mirror attached to the control surface. Movement of a light spot reflected from the small mirror to a wall or screen can be measured and translated to show the angular deflection of the surface. Although operable, optic-geometric methods such as this require considerable manpower and time. In addition, reliability and accuracy is restricted and unreliable.

The present invention obviates these difficulties by providing an electro-mechanical device mounted on the surface of a structural member so that deviation of the member's surface from a given plane will be reflected by an electrical signal generated by a transducer commensurate with the amount of deviation. The signal may be transmitted to a remote location for introduction to recording or data recording equipments.

In accordance with the present invention, one embodiment comprises, a weighted pendulum arrangement suspended from a frame mounted on the structural member. The pendulum arrangement includes a pair of arms having a probe connecting the pair of arms. The probe is movable within a core of a current carrying inductance. The pivotal action of the pendulum arrangement causes the probe to move, which affects the reluctance of the inductance. The variable reluctance affects the coil current which, in turn, may be employed to operate recording equipment.

It is an object of the present invention to provide a novel means for measuring angles of inclination of a structural member. It has been difficult in the past to provide suitable means for measuring relatively minute tilt angles. A feature resides in the present invention which allows the measurement and recording of extremely minute variations in angular inclination such as $\frac{1}{500}$ of an inch in angle variation.

It is another object to provide a simple and economical means for sensing variations of angular inclination so that an electrical signal is generated in response to variations thereof suitable for transmission to remote recording instruments.

Another object is to provide a physically small and light-weight angle sensing device which may be employed for determining the angle of attack of a model undergoing a windtunnel test.

Still another object of the present invention is to provide a sensing means for determining angular variations and generating an electrical signal commensurate to the angular variation. The sensing means serves as a converter of mechanical deflections to electrical signals which are suitable for introduction to data reduction equipments.

These features and objects will be more clearly seen in the following description and drawings, wherein:

Figure 1 is a schematic drawing of a sting mounted aircraft model illustrating the present invention installed to sense variations in the angle of attack;

Figure 2 is a sectional view taken along line 2—2 of Figure 1, illustrating the axial placement of the present invention in the model;

Figure 3 is a sectional view of the present invention taken along line 3—3 of Figure 6, illustrating the pendulum arrangement and transducer within the frame;

Figure 4 is a sectional view taken along line 4—4 of Figure 3, showing the transducer installation and center portion of the present invention;

Figure 5 is a sectional view taken along line 5—5 of Figure 3, illustrating the pendulum arms and weight relationship;

Figure 6:
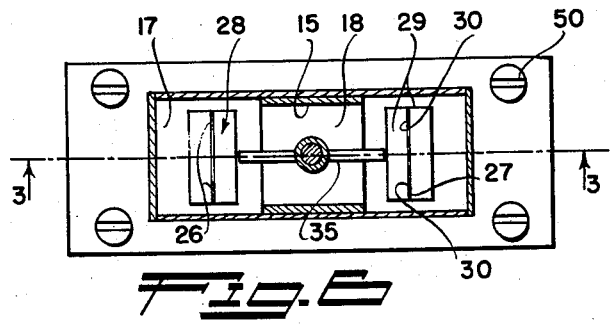
Figure 6 is a sectional view taken along line 6—6 of Figure 3 showing the relationship of the pendulum arms.

Referring to Figures 1 and 2, an inclinometer 10 in accordance with the present invention is shown in a typical installation for determining the angle of attack of an aircraft model 11 undergoing windtunnel testing. Model aircraft 11 may be supported in the windtunnel (not shown) by a conventional sting mount 12 attached to the tail of the model. The inclinometer 10 may be placed within the model, preferably forward of the leading edge of the wing 13, and having its horizontal and vertical dead center lines lying in the same plane as the horizontal and vertical dead center lines of the model. It is to be understood that the inclinometer contemplated by the present invention may be employed in installations other than aircraft models. Usually, the model is positioned to a predetermined angle or plane and, therefore, the inclinometer will assume the same angle or plane.

As shown in Figures 3–6 inclusive, the device of the present invention includes a body 14 having a housing 15 separating a pair of end pieces 16 and 17. The housing is provided with a thickened portion 18 having a bore 20 extending therethrough. Between thickened portion 18 and end piece 16 is an open ended cavity 21.

Within the bore a transducer 22 is provided for detecting relative motion and physical displacement of a sensing probe 23 slidably positioned within a longitudinal bore 24 provided in the transducer. The clearance between the probe and bore 24 is approximately .02 inch. In the embodiment shown in the figures, a variable reluctance or, more precisely, a variable permeance bridge is employed for detecting the linear position of the sensing probe and for generating an electrical signal proportional to the displacement of the sensing probe. Suitable transducers may be purchased from the Crescent Engineering and Research Company, Electronics Division, El Monte, California. The electrical circuit associated with the transducer and connected to leads 25 will be described later with reference to Figure 7.

The probe is supported by a pendulum arrangement which is suspended from end piece 16. The pendulum arrangement comprises a first pair of arms 26 and a second pair of arms 27 preferably fabricated from spring steel located on opposite sides of the housing 15, each pair of arms having a weight such as weight 28 coupled thereto. The weights associated with each pair of arms are connected together by the probe. The weights are formed from two blocks 29 preferably composed of lead weighing approximately .02 lb. having a pair of cooperative recesses 30 which receive the ends of a pair of arms. The blocks are secured by means of a flushed nut 31 engageable with each end of the probe which passes through the weight. Construction in this manner maintains the weights associated with the first and second pair of arms in fixed spaced relationship to each other while the probe, in effect, may float within the transducer bore 24. Vertical displacement of the inclinometer causes movement of the pendulum arrangement due to gravitational pull acting on the respective weights.

The ends of the arms opposite the ends carrying the weights are secured to end piece 16 by means of screws, such as screw 32, passing through end blocks such as block 34. The end blocks, in combination with end piece 16, equal the length of end piece 17 and thereby allow the first and second pair of arms to swing freely between the two end pieces.

When the inclinometer is not in use, it is desirable to provide a means for restricting the pendulum arrangement from swinging freely. In one embodiment, a U-shaped member 35 is provided which may be raised or lowered about the thickened portion 18 of housing 15. In its lower position, each leg 36 of the U-shaped member fits between the thickened portion 18 and weights 28. Construction in this manner restricts the movement of the pendulum arrangement. U-shaped member 35 is welded to a sleeve 37 threadedly engaged with a shank 38 of a screw 40. Screw 40 is rotatable within a recess 41, provided in thickened portion 18 of housing 15 and is mounted through a sleeve 42 secured in end piece 16. A rubber washer 43 is provided about the junction of sleeve 42 and end piece 16. The raising and lowering of U-shaped member 35 is accomplished by rotating a knurled nut 44 attached to screw 40 which causes sleeve 37 to travel between the lower end of sleeve 42 and the surface of thickened portion 18 within cavity 21.

A case 45 is provided which encloses the pendulum arrangement and the transducer of the inclinometer and protects them from dirt and moisture. Dampening means for the pendulum arrangement may be provided by filling the interior of the case with a thin oil.

For certain installations of the inclinometer of the present invention, it has been found desirable to include a base 46 which pivotally mounts the inclinometer on a fulcrum 47 by means of an adjustment screw 48. A plurality of screws, such as screw 50, are provided for securing the base to the surface of a structural member. When screw 48 is loosened, the inclinometer may be adjusted to a selected angle followed by tightening the screw so that the inclinometer angle of tilt will be maintained.

Figure 7:
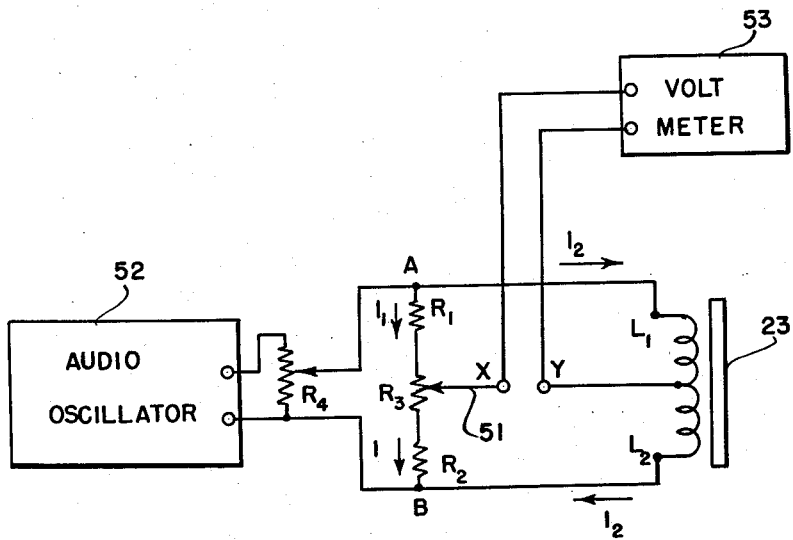
Figure 7 is a schematic drawing of the electrical circuit of the present invention showing the transducing means for generating an electrical signal in response to pendulum movement.

In reference to the circuit diagram shown in Figure 7, the physical configuration of the magnetic fields about coils $L_1$ and $L_2$ is such that as the sensing probe 23 moves simultaneously in two legs of a bridge circuit, the probe displacement increases the permeance of one side of the bridge as that of the opposite side is decreased. Relative linear motion of the probe is the sole mechanical cause of voltage change in the bridge voltage output.

Diagrammatically, the electrical circuit employed in the present invention is shown in Figure 7 wherein the pair of coils $L_1$ and $L_2$ are inductances comprising two legs of the bridge circuit while fixed resistances $R_1$ and $R_2$ comprise the other two legs of the bridge circuit in combination with $R_3$ which is a variable resistance for initial null balancing of the bridge. It has been found preferable to employ the following ohmic values for the above resistances:

$R_1$, $R_2$=1,000 ohms
$R_3$=1,000 ohms, ten turn Helipot Model 1KAZ
$L_1$, $L_2$=impedance of the coils Since $R_3$ is a variable resistance and inasmuch as $R_3$ is connected in series between $R_1$ and $R_2$, the ohmic values of the last mentioned bridge legs will vary in accordance with the contact point of a null adjustment arm 51. The null adjustment arm, in effect, divides $R_3$ so that a portion of $R_3$ is included in the bridge represented by $R_2$. Although the ohmic values of $R_1$ and $R_2$ (including the above respective portions of $R_3$) may vary inversely in response to positioning of the null adjustment arm, their combined ohmic value does not vary. The inclusion of the 1,000 ohm resistors $R_1$ and $R_2$ on each side of $R_3$ improves resolution and accuracy. For any sensitivity or linearity computation, the factor of 1/3 must be applied. For some test operations larger series resistors may be employed, particularly if the range to be tested is small or if the transducer has low sensitivity. If the range of transducer operation is not near the center, it may be necessary to use two different ohmic values of series resistors to establish $R_3$ at the functional region of the bridge. In addition, if precision resistors are not available, ordinary wire wound units may be employed without affecting the accuracy of linearity.

The physical configuration of the magnetic fields of the inductances is such that as the sensing probe 23 moves simultaneously in two legs of the bridge, namely $L_1$ and $L_2$, the permeance of one side of the bridge increases as the permeance of the opposite side decreases. Relative linear motion of probe 23 is the sole mechanical cause of voltage change in the bridge voltage output.

A current is supplied to the bridge circuit at points A and B from an audio oscillator 52 operating at a frequency, for example of approximately 1,000 cycles per second. The output frequency may be set at any desirable rate having approximately a 1 volt carrier. Potentiometer $R_4$ is employed for selecting scale settings and for regulating the voltage output of the oscillator. For optimum performance, it is desirable to determine the natural frequency of the transducer. This is the carrier frequency at which minimum phase shift occurs throughout the linear range and may be determined by varying the oscillator frequency until the null voltages are lowest at all points along the linear range.

A pair of output contacts are placed in the bridge at points X and Y. When the sensing probe is not in motion so that the permeance of $L_1$ and $L_2$ are equal, no current will flow from points X and Y; that is, there is no voltage difference between the points X and Y since the voltage at each point is the same.

The total current divides during one-half of cycle of the alternating oscillation voltage at A and flows into the legs of the bridge forming currents $I_1$ through $R_1$, $R_3$ and $R_2$ and $I_2$ through $L_1$ and $L_2$. During the next half cycle the current direction is reversed. If there is no potential difference between points X and Y, the voltage drop across $R_1$ including a portion of $R_3$ is equal to the voltage drop across $L_1$.

When the sensing probe 23 of the transducer is displaced, a difference of permeance exists between $L_1$ and $L_2$ which affects their impedance values. Such a change of impedance unbalances the bridge circuit since a potential difference is produced between the points X and Y. An electrical signal proportionate to the amount of sensing probe displacement is thereby generated. This signal may be transmitted to recording or indicating equipment. In the present instance, a suitable alternating current vacuum tube volt meter 53 is employed to indicate the amount of potential difference between points X and Y which represents probe displacement and hence the amount of angular deflection of the inclinometer.

In actual operation, the inclinometer of the present invention is placed on the surface of a structural member to be tested. If desirable, the base 46 may be secured to the structural member by means of screws 50. If the surface of the structural member is not horizontal and it is desirable to tilt the inclinometer so that its central axis lies in a plane different than the plane of the structural member surface, screw 48 may be loosened as the inclinometer is pivoted on fulcrum 47. Tightening of screw 48 maintains the inclinometer in a fixed spaced relationship with the surface of the structural member.

Any variation in the angular plane of the structural member is reflected by tilting the inclinometer which causes the swinging of the pendulum weights along the central axis of the inclinometer. The position of probe 23 is displaced in response to the movement of the weights, the first and second pairs of arms 26 and 27 bend near end piece 16 due to the gravitational pull of the weights. Weights, such as weight 28, provide for smooth operation and whenever a fine oil is used so that rapid or forceful swinging of the pendulum arrangement is avoided. Displacement of the probe results in a potential difference at points X and Y of the bridge circuit which is sensed and indicated by volt meter 53.

When testing has been completed and the inclinometer removed from the structural member, screw 40 is rotated in order to lower the U-shaped member 35 into a position to prevent the pendulum weights from swinging freely.

Although a transducer of the variable reluctance type is shown as a representative example, it is to be understood that other suitable transducers may be employed, such as by attaching conventional strain gauges to the pendulum arms. In this manner, as the pendulum arms stretch during bending, a reading can be obtained at strain gauge output terminals and indicated by conventional means.

Having described only typical forms of the invention I do not wish to be limited to the specific details set forth, but wish to reserve to myself any variations or modifications that may appear to those skilled in the art and fall within the scope of the following claims.

I claim:

1. An inclinometer for determining the angle of slope comprising, a casing, a base having at least one straight longitudinal surface adapted to be applied against the slope to be measured, a fulcrum carried on the base, adjustable screw means mounting the casing on the fulcrum so that the casing is adjustable to a pre-determined position relative to the straight longitudinal surface of the base, a body within the casing having an upper and a lower end piece spaced apart and connected by a housing, the housing being provided with a thickened portion having a bore extending therethrough and having an open ended cavity provided above the thickened portion, a pair of pendulum weights separated by the housing movable in response to the angle of inclination of the slope to be measured, a pair of spring arms pivotally connecting each weight of the pair to opposite ends of the upper end piece allowing axial movement of the weights, a variable reluctance transducer fitted into the bore of the housing including a coil and a probe passing through the coil connecting the pair of weights in spaced relationship, the probe being in a free and unrestricted sliding relationship respective to the coil for generating an electrical signal in the coil in response to linear displacement of the probe.

2. The invention defined in claim 1 including U-shaped means adjustably supported on the upper end piece between the arms supporting the weights arranged to travel within the cavity of the housing into engagement with the thickened portion of the housing to selectively restrict axial movement of the weights.

3. The invention as defined in claim 2 including an electrical bridge circuit having four balancing legs wherein two legs of the four legs of the bridge circuit are represented by each half of the coil of the transducer associated with the probe so that linear displacement of the probe produces a difference of impedance between the two legs represented by the coil halves so that the combined impedance of the coil halves remains constant while the impedance of each half varies.

References Cited in the file of this patent

UNITED STATES PATENTS

| | | |
|---|---|---|
| 691,146 | Janin | Jan. 14, 1902 |
| 2,487,083 | Warshaw | Nov. 8, 1949 |
| 2,563,899 | Wiancko | Aug. 14, 1951 |
| 2,600,266 | Rothweiler | June 10, 1952 |
| 2,744,335 | Litman | May 8, 1956 |
| 2,765,540 | MacMillan et al. | Oct. 9, 1956 |

FOREIGN PATENTS

| | | |
|---|---|---|
| 117,812 | Great Britain | July 17, 1919 |
| 934,337 | France | Jan. 10, 1948 |